(12) United States Patent
Horita

(10) Patent No.: US 9,343,109 B2
(45) Date of Patent: May 17, 2016

(54) VIDEO EDITING DEVICE

(71) Applicant: Panasonic Corporation, Osaka (JP)

(72) Inventor: Seiji Horita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 73 days.

(21) Appl. No.: 14/312,807

(22) Filed: Jun. 24, 2014

(65) Prior Publication Data

US 2015/0187389 A1 Jul. 2, 2015

Related U.S. Application Data

(63) Continuation of application No. PCT/JP2014/000867, filed on Feb. 19, 2014.

(30) Foreign Application Priority Data

Dec. 26, 2013 (JP) ................. 2013-268675

(51) Int. Cl.
 *H04N 9/88* (2006.01)
 *G11B 27/036* (2006.01)
 (Continued)

(52) U.S. Cl.
 CPC ............ *G11B 27/036* (2013.01); *G11B 27/105* (2013.01); *G11B 27/34* (2013.01); *G11B 27/36* (2013.01); *G11B 31/006* (2013.01); *H04N 5/77* (2013.01)

(58) Field of Classification Search
 CPC .... G11B 27/036; G11B 27/34; G11B 27/105; G11B 31/006; H04N 5/77
 USPC .......... 386/263, 264, 270, 271, 277, 278, 281
 See application file for complete search history.

(56) References Cited

U.S. PATENT DOCUMENTS

| 2002/0057894 A1 | 5/2002 | Ishige |
| 2003/0174213 A1 | 9/2003 | Matsumoto et al. |

(Continued)

FOREIGN PATENT DOCUMENTS

| JP | 2005-168056 | 6/2005 |
| JP | 2006-303594 | 11/2006 |

(Continued)

OTHER PUBLICATIONS

International Search Report for corresponding International Application No. PCT/JP2014/000867 mailed Apr. 15, 2014 (English translation provided; previously listed on IDS submitted on Jun. 24, 2014 with application).

(Continued)

*Primary Examiner* — Robert Chevalier
(74) *Attorney, Agent, or Firm* — Renner, Otto, Boisselle & Sklar, LLP

(57) ABSTRACT

A video editing device, when having failed to obtain a portion of high-resolution video data from a video camera through a network, provides, to the user, low-resolution video data which has been previously transferred from the video camera, instead of the portion of the high-resolution video data. In parallel with this, the video editing device automatically searches for the missing high-resolution video data, on a network, using the ID of a video file or the ID of a recording medium, and if it is found, supplements a video which is to be provided to the user, with the found high-resolution video data.

6 Claims, 17 Drawing Sheets

(51) Int. Cl.
*G11B 27/34* (2006.01)
*G11B 27/36* (2006.01)
*G11B 31/00* (2006.01)
*H04N 5/77* (2006.01)
*G11B 27/10* (2006.01)

(56) References Cited

U.S. PATENT DOCUMENTS

2005/0195975 A1* 9/2005 Kawakita ............... H04L 9/0822
380/30
2006/0245721 A1 11/2006 Moriya et al.
2007/0147799 A1* 6/2007 Takamori ............... H04N 5/775
386/200
2011/0026414 A1* 2/2011 Banerjee ............... H04L 1/0002
370/252

FOREIGN PATENT DOCUMENTS

JP 2006-352556 12/2006
JP 2008-199677 8/2008
WO WO 01/60062 A1 8/2001

OTHER PUBLICATIONS

International Search Report for corresponding International Application No. PCT/JP2014/000867 mailed Apr. 15, 2014.
Form PCT/ISA/237 for corresponding International Application No. PCT/JP2014/000867 dated Apr. 15, 2014.

* cited by examiner

FIG.4A

```xml
<?xml version="1.0"?>
<P2Main>
 <ClipContent>
  <ClipName>001</ClipName>
  <GlobalClipID>
    060A2B340101010501010D4313000000AB935E77616505D100804
    58200000002
  </GlobalClipID>
  <Duration>118</Duration>
  <EditUnit>1001/30000</EditUnit>
  <EssenceList>
   <Video ValidAudioFlag="false">
    <VideoFormat>MXF</VideoFormat>
    <Codec>DV100_1080/59.94i</Codec>
    <FrameRate DropFrameFlag="true">59.94i</FrameRate>
    <StartTimecode>16:05:59:27</StartTimecode>
    <StartBinaryGroup>270F6003</StartBinaryGroup>
    <AspectRatio>16:9</AspectRatio>
    <VideoIndex>
      <StartByteOffset>32768</StartByteOffset>
      <DataSize>56640000</DataSize>
    </VideoIndex>
   </Video>
   <Audio>
    <AudioFormat>MXF</AudioFormat>
    <SamplingRate>48000</SamplingRate>
    <BitsPerSample>16</BitsPerSample>
    <AudioIndex>
      <StartByteOffset>32768</StartByteOffset>
      <DataSize>377976</DataSize>
    </AudioIndex>
   </Audio>
  </EssenceList>
```

FIG.4B

```
<ClipMetadata>
  <DataSource>SHOOTING</DataSource>
  <Access>
    <CreationDate>2013-09-26T11:35:22+00:00</CreationDate>
    <LastUpdateDate>2013-09-26T11:35:25+00:00</LastUpdateDate>
  </Access>
  <Device>
    <Manufacturer>Panasonic</Manufacturer>
    <SerialNo.>92TA00001</SerialNo.>
    <ModelName>AG-HPX600MC</ModelName>
  </Device>
  <Media>
    <Manufacturer>Panasonic</Manufacturer>
    <SerialNo.>AZJ08H0001</SerialNo.>
    <ModelName>AJ-P2C032AG</ModelName>
  </Media>
  <Shoot>
    <StartDate>2013-09-26T11:32:45+00:00</StartDate>
    <EndDate>2013-09-26T11:32:49+00:00</EndDate>
  </Shoot>
  <Memos>
    <Memo id="0">
      <Offset>82</Offset>
      <Text>President</Text>
    </Memo>
  </Memos>
  </ClipMetadata>
 </ClipContent>
</P2Main>
```

FIG.5

```
<P2Main>
 <Device>
  <Manufacturer>Panasonic</Manufacturer>
  <SerialNo.>92TA00001</SerialNo.>
  <ModelName>AG-HPX600MC</ModelName>
 </Device>
</P2Main>
```

FIG. 7

```xml
<?xml version="1.0"?>
<P2Main>
 <EditContent>
   <UserEditListName>467945796795678890</UserEditListName>
   <Duration>126</Duration>
   <EditUnit>1001/30000</EditUnit>
   <StartTimecode>00:00:00:00</StartTimecode>
   <FrameRate DropFrameFlag="true">59.94i</FrameRate>
   <Codec>DV100_1080/59.94i</Codec>
   <TrackList>
     <Track>
       <EventList>
         <Event>
           <Offset>0</Offset>
           <Duration>61</Duration>
           <Source>
             <GlobalClipID>
               060A2B340101010501010D4313000000A50A306F446605
               EB00804582FCF7D003
             </GlobalClipID>
             <Offset>51</Offset>
           </Source>
         </Event>
         <Event>
           <Offset>61</Offset>
           <Duration>65</Duration>
           <Source>
             <GlobalClipID>
               060A2B340101010501010D4313000000297D1F6F446605
               F800804582FCF7D003
             </GlobalClipID>
             <Offset>24</Offset>
           </Source>
         </Event>
       </EventList>
     </Track>
   </TrackList>
 </EditContent>
</P2Main>
```

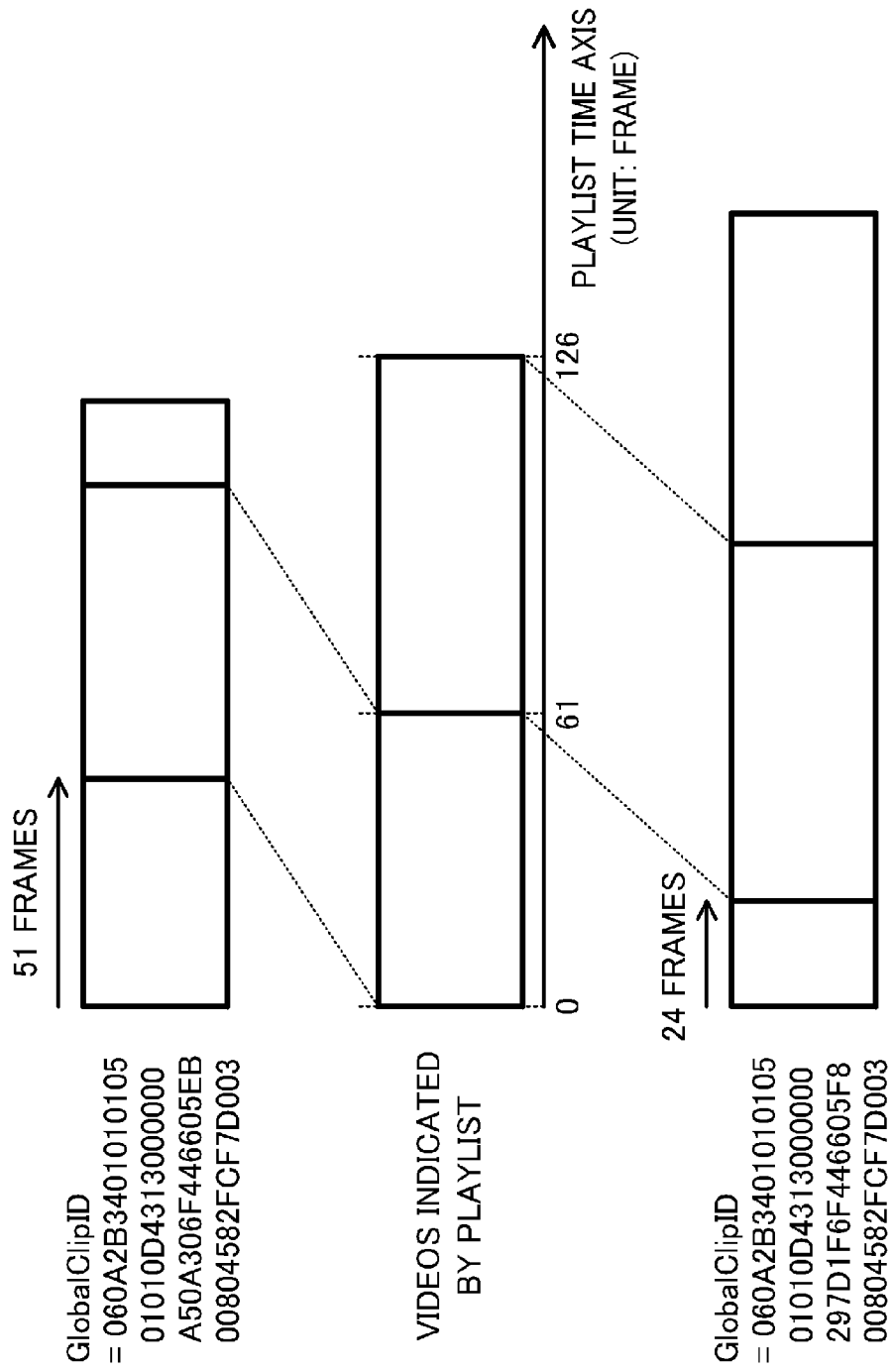

```
<?xml version="1.0"?>
<P2Main>
 <CommandID>64360</CommandID>
  <Edit>
   <Duration>61</Duration>
   <Source>
    <GlobalClipID>
       060A2B340101010501010D4313000000A50A306F446605
       EB00804582FCF7D003
    </GlobalClipID>
    <Offset>51</Offset>
   </Source>
  </Edit>
</P2Main>
```

FIG.11

```xml
<?xml version="1.0"?>
<P2Main>
 <EditContent>
  <UserEditListName>467945796795678890</UserEditListName>
  <Duration>126</Duration>
  <EditUnit>1001/30000</EditUnit>
  <StartTimecode>00:00:00:00</StartTimecode>
  <FrameRate DropFrameFlag="true">59.94i</FrameRate>
  <Codec>DV100_1080/59.94i</Codec>
  <TrackList>
   <Track>
    <EventList>
     <Event>
      <Offset>0</Offset>
      <Duration>61</Duration>
      <Source>
       <Name>000a</Name>
       <Offset>0</Offset>
      </Source>
     </Event>
     <Event>
      <Offset>61</Offset>
      <Duration>65</Duration>
      <Source>
       <Name>00b</Name>
       <Offset>0</Offset>
      </Source>
     </Event>
    </EventList>
   </Track>
  </TrackList>
 </EditContent>
</P2Main>
```

FIG.12

```
<?xml version="1.0"?>
<P2Main>
 <EditContent>
   <UserEditListName>467945796795678890</UserEditListName>
   <Duration>126</Duration>
   <EditUnit>1001/30000</EditUnit>
   <StartTimecode>00:00:00:00</StartTimecode>
   <FrameRate DropFrameFlag="true">59.94i</FrameRate>
   <Codec>DV100_1080/59.94i</Codec>
   <TrackList>
     <Track>
       <EventList>
         <Event>
           <Offset>0</Offset>
           <Duration>61</Duration>
           <Source>
             <Name>000a</Name>
             <Offset>0</Offset>
           </Source>
         </Event>
         <Event>
           <Offset>61</Offset>
           <Duration>65</Duration>
           <Source proxy="yes">
             <Name>00b</Name>
             <GlobalClipID>
                 060A2B340101010501010D4313000000297D1F6F446605
                 F800804582FCF7D003
                 </GlobalClipID>
             <Offset>24</Offset>
           </Source>
         </Event>
       </EventList>
     </Track>
   </TrackList>
 </EditContent>
</P2Main>
```

FIG.13

```xml
<?xml version="1.0"?>
<P2Main>
  <Device>
    <Manufacturer>Panasonic</Manufacturer>
    <SerialNo.>92TA00001</SerialNo.>
    <ModelName>AG-HPX600MC</ModelName>
  </Device>
  <Contents>
    <Shot>
      <Clip>
         <GlobalClipID>
            060A2B3401010105010100D43130000004BD80F76446605
            CC00804582FCF7D003
         </GlobalClipID>
      </Clip>
      <Clip>
         <GlobalClipID>
            060A2B3401010105010100D43130000000BABD175446605
            C900804582FCF7D003
         </GlobalClipID>
      </Clip>
    </Shot>
    <Shot>
      <Clip>
         <GlobalClipID>
            060A2B3401010105010100D4313000000FE1A6775446605
            DD00804582FCF7D003
         </GlobalClipID>
      </Clip>
    </Shot>
  </Contents>
</P2Main>
```

FIG.17

```
<P2Main>
  <Device>
    <Manufacturer>Panasonic</Manufacturer>
    <SerialNo.>92TA00001</SerialNo.>
    <ModelName>AG-HPX600MC</ModelName>
  </Device>
  <Media>
    <Manufacturer>Panasonic</Manufacturer>
    <SerialNo.>AZJ08H0001</SerialNo.>
    <ModelName>AJ-P2C032AG</ModelName>
  </Media>
</P2Main>
```

VIDEO EDITING DEVICE

CROSS-REFERENCE TO RELATED APPLICATIONS

This is a continuation of International Application No. PCT/JP2014/000867 filed on Feb. 19, 2014, which claims priority to Japanese Patent Application No. 2013-268675 filed on Dec. 26, 2013. The entire disclosures of these applications are incorporated by reference herein.

BACKGROUND

The present disclosure relates to video editing devices which are connected to a network and can communicate with an external terminal typified by a camcorder.

High-speed wireless communications have in recent years been becoming available in urban areas, which are typified by widespread use of Worldwide Interoperability for Microwave Access (WiMAX) or 4G/Long Term Evolution (LTE). As a result, it has become practical to upload digital data, such as photographs, videos, etc. captured using a digital camera or a digital video camera, to an online service, such as a cloud service etc., through wireless communications.

For example, Japanese Unexamined Patent Publication No. 2005-168056 describes a camera which includes a data communication unit which transfers image data of a subject and identification data corresponding to the image data, a captured frame storage unit, and a transfer image data storage unit. As a result, the user can upload captured image data to an online service provided by a photographic shop etc., and therefore, it is not necessary for the user to hand a recording medium to a photofinisher, i.e., it is not necessary to put time and effort into ordering printing etc. Thus, the convenience of transferring photographs or videos to a server on the Internet is considerably beneficial to users.

On the other hand, International Patent Publication No. WO01/060062 describes a video recording device which compresses a video signal to simultaneously generate high-resolution video data and low-resolution video data, stores the high-resolution video data to a recording medium provided in the device, and wirelessly transmits the low-resolution video data to a separate editing device. This document also describes that the user performs editing by a separate editing device using the low-resolution video data, and only an edited list obtained as a result of the edition is wirelessly written to the recording medium provided in the video recording device. This technique has been made based on the fact that when video data is to be transferred, the size of high-resolution video data to be recorded is considerably large compared to the transfer rate of wireless transmission which is widely available at present.

For example, as of 2013, the effective upload rate in using a 4G/LTE network which is a wireless communication network available within a relatively wide area in Japan is not more than about 2-15 Mbps, while the bit rate of video data to be recorded which is widely used in the broadcasting business is about 25-200 Mbps. In other words, it is not currently practical to transfer all video data to be recorded to a server on the Internet using a wireless network. This is why the video recording device described in International Patent Publication No. WO01/060062 above transfers low-resolution video data separately generated from the same video source instead of high-resolution video data to be recorded.

Japanese Unexamined Patent Publication No. 2008-199677 describes a video broadcasting system which is connected to a video camera, and simultaneously generates high-resolution video data and low-resolution video data, transfers the low-resolution video data to a receiver terminal through a network, and in addition, in response to a retransmission request from the receiver terminal, broadcasts high-resolution video data of a video which starts a predetermined time before the time of receiving the video retransmission request. As a result, the user can check all video data transmitted from a camera located at a remote place, and obtain high-resolution video data of only a portion which the user has determined by the checking is necessary, through a network. For example, the convenience of this system is more obvious in the case where a video camera is used during news gathering while a receiver terminal is provided in a broadcast station. Videos used in news programs mostly have a time length of as short as about 30 seconds to several minutes. However, it is necessary to check the entire video in order to find the necessary portion. However, it takes a lot of time to bring a video camera from a place where news gathering is performed back to a broadcast station, and therefore, it is necessary to transfer a video from the video camera to the broadcast station through a network. To do so, low-resolution video data is generated and transferred. However, the low-resolution video data has poor definition when it is displayed on a television. Therefore, information related to a necessary portion is sent from the receiver terminal back to the video broadcasting system, so that high-resolution video data of only the necessary portion is obtained. The transfer range is limited only to a necessary portion. Therefore, even if the transfer rate of a wireless network is low, the transfer can be expected to be completed within a practical period of time.

A video editing device will be discussed which operates in cooperation with a video camera which has a function of recording high-resolution video data to a recording medium included therein, and a function of transferring low-resolution video data generated simultaneously with the high-resolution video data to a server etc. through a network.

As described above, the user browses through low-resolution video data transferred from the video camera using the video editing device, to specify a necessary range of a video. The video editing device sends information about the specified range back to the video camera through a network, so that high-resolution video data of that portion is transferred from the video camera to the video editing device.

However, here, a problem arises that when information about a necessary range of a video is sent back from the video editing device, the corresponding high-resolution video data does not necessarily exist in the video camera.

Commonly used video cameras mostly have a removable recording medium to which a captured video is recorded in a video file format. Examples of a widely used recording medium include Secure Digital (SD) memory cards and Blu-ray (registered trademark) Disc Rewritable (BD-RE) media, and P2 cards and Professional Disc media for video cameras used in the broadcasting business. These recording media can be removed from a video camera after recording has been finished.

A video camera and a video editing device are highly likely to be located at places which are physically separated very far from each other. Therefore, it is difficult for a user who is operating the video editing device to find a state of a recording medium inserted in the video camera, and it is also difficult for a user who is operating the video camera to know when a request for high-resolution video data will be sent from the video editing device.

Specifically, when a video editing device requests a video camera to transfer high-resolution video data, then if a recording medium storing the desired video data has been removed from the video camera, the video editing device cannot obtain the high-resolution video data. Also, the recording medium is not necessarily connected to the same video camera, and may be inserted in a different video camera.

When the recording medium itself is subsequently obtained, a portion including only low-resolution video data may be replaced with high-resolution video data. However, for example, particularly when only some of a plurality of specified ranges have not been successfully obtained, it takes a lot of time and effort for the user to manually manage or determine which of the ranges has not been successfully obtained.

SUMMARY

The present disclosure describes implementations of a video editing device in which, even when the video editing device has failed to obtain high-resolution video data because, for example, a recording medium has been removed from a video camera, the user can obtain a best editing result that is available at that time.

The present disclosure also describes implementations of a video editing device which automatically finds high-resolution video data which the video editing device has failed to obtain, and adds a change to an editing result based on the high-resolution video data.

A video editing device according to an embodiment of the present disclosure is a video editing device connected to a network including a proxy video receiver configured to receive low-resolution video data from an external terminal through the network, a first recording medium configured to store the low-resolution video data received by the proxy video receiver, an extraction command issuance unit configured to transmit, to the external terminal, a command to extract and transfer high-resolution video data corresponding to information of video data included in a playlist which is generated by a user using the low-resolution video data stored in the first recording medium, based on the playlist, a main-track video receiver configured to receive the high-resolution video data from the external terminal, a second recording medium configured to store the high-resolution video data received by the main-track video receiver, a reception error detector configured to detect a failure to obtain the high-resolution video data from the external terminal, and a video supplementation unit configured to, when the reception error detector has detected the failure to obtain the high-resolution video data, supply low-resolution video data corresponding to the high-resolution video data instead of the high-resolution video data.

The video editing device of the example of the present disclosure further includes a missing video manager configured to, when the reception error detector has detected a failure to receive high-resolution video data, store ID information for uniquely identifying a recording medium storing the high-resolution video data in the external terminal, and ID information for uniquely identifying the high-resolution video data, in association with each other, and a connected media information obtaining unit configured to obtain information of the recording medium inserted in the external terminal, through the network. When the connected media information obtaining unit has detected that a recording medium having ID information matching ID information of a recording medium stored in the missing video manager is inserted in the external terminal, the extraction command issuance unit transmits, to the external terminal, a command to extract and transfer video data having ID information matching ID information of video data which is stored in the missing video manager in association with the ID information of the recording medium.

The video editing device of the present disclosure allows the user to obtain a best editing result that is available at that time even when the video editing device has failed to obtain high-resolution video data, because, for example, a recording medium has been removed from a video camera. The video editing device of the present disclosure also automatically finds high-resolution video data which the video editing device has failed to obtain, and adds a change to an editing result based on the high-resolution video data.

BRIEF DESCRIPTION OF THE DRAWINGS

FIG. 4A is a diagram showing an example meta-data file of FIG. 3.

FIG. 4B is a diagram showing a continuation of FIG. 4A.

FIG. 5 is a diagram showing example information (camera ID) which a video editing device is informed of by a video camera.

FIG. 7 is a diagram showing an example playlist.

FIG. 8 is a diagram for describing selection of videos indicated by the playlist of FIG. 7.

FIG. 11 is a diagram showing an example playlist (all necessary main-track videos are contained) stored in the third recording medium of FIG. 1.

FIG. 12 is a diagram showing an example playlist (some necessary main-track videos have not been successfully obtained) stored in the third recording medium of FIG. 1.

FIG. 13 is a diagram showing example information (a list of video IDs) which a video editing device is informed of by a video camera.

FIG. 17 is a diagram showing example information (recording medium ID) which a video editing device is informed of by a video camera.

DETAILED DESCRIPTION

Embodiments will be described in detail hereinafter with reference to the accompanying drawings. To avoid unnecessarily obscuring the present disclosure, well-known features may not be described or substantially the same elements may not be redundantly described, for example. This is for ease of understanding.

The drawings and the following description are provided to enable those skilled in the art to fully understand the present disclosure and are in no way intended to limit the scope of the present disclosure as set forth in the appended claims.

(First Embodiment)

[1-1. Configuration of System]

Firstly, a configuration of a video editing device according to the present disclosure will be described.

Figure 1:
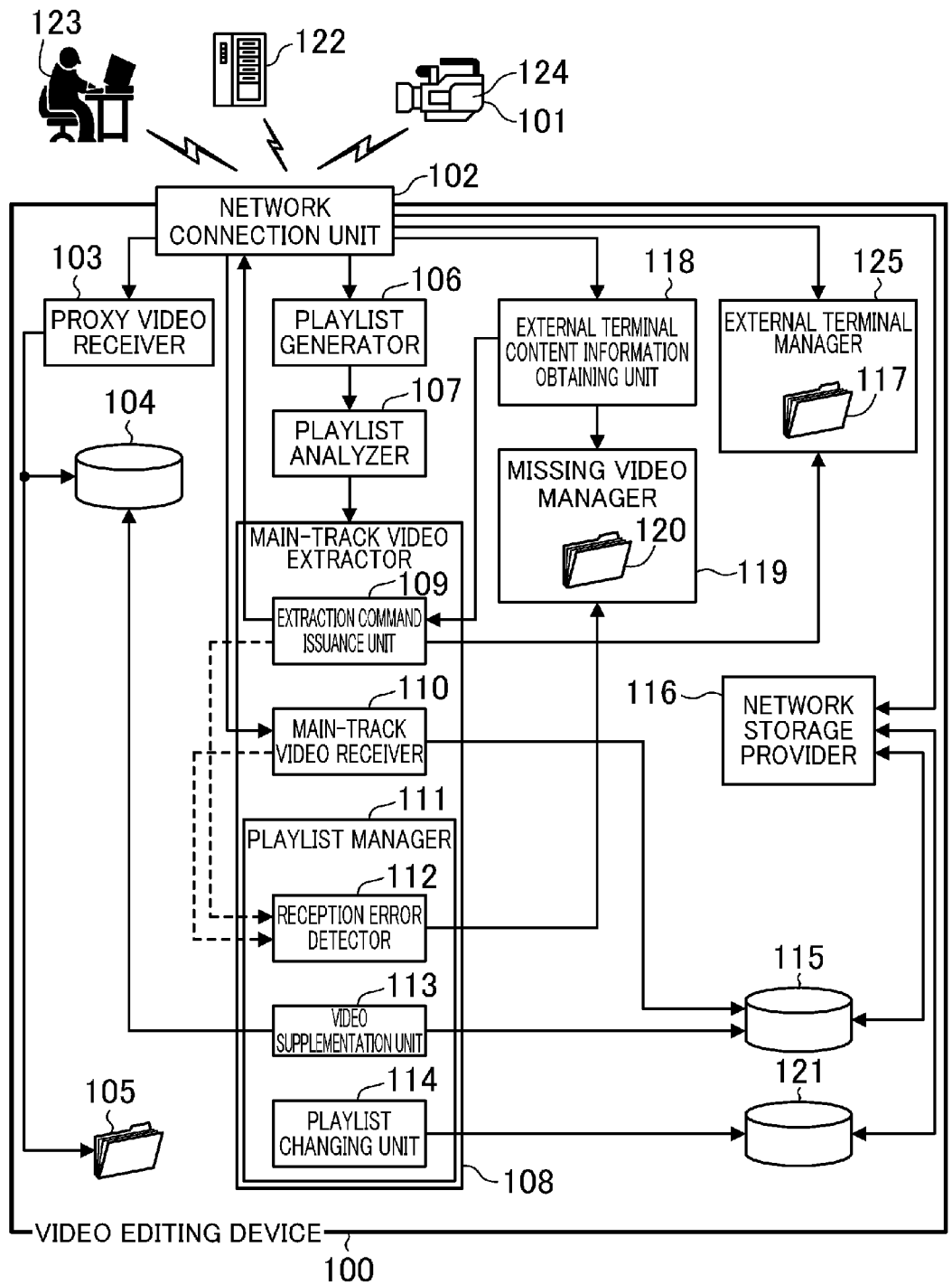
FIG. 1 is a block diagram of a video editing device according to a first embodiment.

FIG. 1 is a block diagram of a video editing device according to this embodiment. The video editing device 100 includes a network connection unit 102, a proxy video receiver 103, a first recording medium 104 for storing a low-resolution video file, and a proxy database 105. The video editing device 100 communicates with an external terminal 101 through the network connection unit 102. Here, the external terminal 101 means electronic equipment which has a function of generating high-resolution video data and low-resolution video data, and a function of transferring video data to the video editing device 100 through a network. A specific example of the external terminal 101 is a video camera which has a means for connecting to a network. A detailed example configuration of the external terminal 101 will be described below.

The video editing device 100 receives low-resolution video data (hereinafter referred to as a "proxy video") transferred from the external terminal 101 using the proxy video receiver 103. The received proxy video is stored in the first recording medium 104. Meta-data etc. related to the stored proxy video is registered in the proxy database 105. For example, the meta-data registered in the proxy database 105 includes information for identifying or determining what video file recorded in what recording medium of what video camera the proxy video has been transferred based on, and ID information for uniquely identifying a high-resolution video file (hereinafter referred to as a "main-track video") corresponding to the proxy video. A detailed example of the meta-data will be described below.

The video editing device 100 also includes an external terminal manager 125. The external terminal manager 125 is software which holds information related to a network of the external terminal 101 connected to the video editing device 100, and also allows for search and reference of the information. The external terminal manager 125 includes an external terminal database 117. The external terminal 101, when connected to a network, regularly communicates with the external terminal manager 125 included in the video editing device 100 through the network even if there is not a video to be transferred. This communication is used by the video editing device 100 to find that the external terminal 101 is currently connected to the network. When the communication is continued, the external terminal manager 125 holds, in the external terminal database 117, a pair of the IP address of the external terminal 101 and ID information for uniquely identifying the external terminal 101. The video editing device 100 further includes a playlist generator 106, a playlist analyzer 107, a main-track video extractor 108, a missing video manager 119, a second recording medium 115 for storing a main-track video, and a third recording medium 121 for storing a playlist. The playlist generator 106 is application software which allows the user of the video editing device 100 to browse a proxy video stored in the first recording medium 104 and to specify a necessary video range of the proxy video. Here, the playlist generator 106 does not necessarily need to be an application which allows the user to directly operate the video editing device 100. The playlist generator 106 may be an application which allows the user to remotely operate the video editing device 100 through a network etc. Note that a list of necessary video ranges specified by the user is hereinafter referred to as a "playlist." A playlist has an ID for uniquely identifying itself.

The playlist analyzer 107 is software which analyzes the contents of a playlist generated by the user using the playlist generator 106, and checks the result of the analysis against information stored in the proxy database 105, to obtain information indicating what recording medium of what video camera a main-track video corresponding to a video range put by the user on the playlist is stored in under what name. The information thus obtained is output to the main-track video extractor 108.

The main-track video extractor 108 is software including an extraction command issuance unit 109, a main-track video receiver 110, and a playlist manager 111. The extraction command issuance unit 109 commands, through a network, the external terminal 101 which stores a main-track video to start transfer of video data of the main-track video corresponding to a portion which has been put by the user on the playlist as a necessary video range, based on an output of the playlist analyzer 107. Note that a location on a network of the external terminal 101 is held in the external terminal database 117 as described above. The main-track video receiver 110 receives video data of a main-track video which has been transferred from the external terminal 101 in accordance with the command of the extraction command issuance unit 109, and stores the received data into the second recording medium 115.

The playlist manager 111 includes a reception error detector 112, a video supplementation unit 113, and a playlist changing unit 114.

The reception error detector 112, when the transfer process of a main-track video from the external terminal 101 to the video editing device 100 has failed, is informed of the occurrence of the failure from the extraction command issuance unit 109 or the main-track video receiver 110. Here, the reception error means a failure to obtain main-track video data, which occurs, for example, when an external terminal which has captured the main-track video to be transferred is not connected to a network, or when the external terminal 101 is connected to a network, but a recording medium which stores the main-track video has already been removed from the external terminal.

The reception error detector 112, when informed of the occurrence of a reception error, informs the missing video manager 119, the video supplementation unit 113, and the playlist changing unit 114 of ID information for uniquely identifying a main-track video which has not been successfully received, a range of the main-track video data which has been selected by the user, and the ID of a playlist including the range.

The missing video manager 119 is software which, when main-track video data has not been successfully transferred from the external terminal 101 to the video editing device 100 for some reason, stores ID information etc. for uniquely identifying the main-track video, and allows for search and reference of the stored information. The missing video manager 119 includes a missing video database 120. In the missing video database 120, the ID information of a video which has been received from the reception error detector 112, a range of the main-track video data which has been selected by the user, and the ID of a playlist including the range, are registered.

The video supplementation unit 113 is software or hardware for supplying a proxy video corresponding to main-track video data which has not been successfully transferred (the video supplementation unit 113 is informed of information related to the main-track video data by the reception error detector 112) instead of the main-track video data. This function may, for example, be specifically implemented as follows: the video supplementation unit 113 copies a proxy video corresponding to main-track video data which has not been successfully transferred, from the first recording medium 104 to the second recording medium 115. Here, the operation referred to as "copy" is not limited to simple duplication of a file. The copy operation may include operation of extracting only a portion of a proxy video file based on a video range specified by the user in a playlist, and writing the portion of the video file to the second recording medium 115, or operation of generating, on the second recording medium 115, a link to a proxy video existing on the first recording medium 104 instead of duplicating the file itself.

The playlist changing unit 114 is software which changes or rewrites information related to a main-track video which has been received from the reception error detector 112, of the contents of the playlist generated by the user, so that the absence of the main-track video is explicit. A specific example of the operation will be described below. The playlist changing unit 114 writes the rewritten playlist to the third recording medium 121. Note that when the video editing device 100 has successfully obtained all main-track videos, the playlist changing unit 114 directly writes the playlist generated by the user to the third recording medium 121. Note that when the external terminal 101 processes main-track video data before transmitting it, the playlist changing unit 114 may change the playlist based on the result of the processing. A specific example will be described below.

The video editing device 100 further includes a network storage provider 116. The network storage provider 116 is software which allows a user 123 who uses the video editing device 100 through a network to refer to the contents of the second recording medium 115 and the contents of the third recording medium 121. The network storage provider 116 allows the user 123 to copy main-track video data which has been transferred from the external terminal 101 to the video editing device 100 based on the playlist generated by the playlist generator 106, and the playlist related to the main-track video data, to their own computer etc. through a network. In other words, the user 123 can obtain high-resolution video data of a necessary portion of a video and a playlist related to the high-resolution video data, through the video editing device 100, while the user is located at a place which is physically separated very far from the external terminal 101. For a portion for which high-resolution video data has not been successfully obtained for some reason, low-resolution video data is substituted, and it is described on the playlist that the low-resolution data is substituted. Therefore, a video which is obtained by playing the playlist back has best quality that can be available at that time.

The video editing device 100 further includes an external terminal content information obtaining unit 118. The external terminal content information obtaining unit 118 is software which obtains, through a network, a list of the ID information of main-track video data stored in a recording medium 124 included in the external terminal 101 connected to the video editing device 100 through the network. The list of the ID information of video data may be obtained by the external terminal content information obtaining unit 118 querying the external terminal 101 at a timing when connection is established between the external terminal 101 and the video editing device 100 and information of the external terminal 101 is registered in the external terminal database 117, or at regular timings, or alternatively, by the external terminal 101 informing the external terminal content information obtaining unit 118 at a timing when connection of the network is established, at a timing when the recording medium 124 is inserted or removed, or at regular timings.

The external terminal content information obtaining unit 118 has a function of comparing ID information included in the list of ID information in the external terminal 101 which has been obtained by the above procedure with ID information registered in the missing video manager 119, and if there is matching ID information, informing the extraction command issuance unit 109 of the ID information, information necessary to access an external terminal having a recording medium in which video data corresponding to the ID information is stored, and information about the selected range and the ID of a playlist from which the information is missing, that are registered in the missing video manager 119 in association with the ID information. Here, the information necessary to access an external terminal having a recording medium in which video data corresponding to ID information is stored, specifically means information necessary to identify a location of the external terminal on a network, such as the IP address of the external terminal, or a key necessary to retrieve the IP address of the external terminal using the external terminal database 117.

The extraction command issuance unit 109 commands, through a network, the external terminal 101 to start transfer of a specified range of a main-track video corresponding to the ID information of main-track video data which has been received from the external terminal content information obtaining unit 118. The main-track video receiver 110 stores the main-track video received by the above procedure to the second recording medium 115. The playlist changing unit 114 also erases a description indicating the absence of the main-track video data stored to the second recording medium 115 by the above procedure, from the playlist stored in the third recording medium 121, and writes and stores a new description indicating the presence of the main-track video, to the second recording medium 115. In this case, the existing playlist may be overwritten, or a new playlist may be stored. The video editing device 100 also informs the user 123 that the playlist has been updated, through an electronic mail server 122.

With the above configuration, when high-resolution video data has not been obtained due to disconnection of the external terminal 101 from a network, removal of the recording medium 124, etc., the missing high-resolution video data is automatically supplied to the video editing device 100 and provided to the user at a timing when the external terminal 101 is connected to a network again or at a timing when the recording medium 124 is inserted into the external terminal 101.

[1-2. Operation]

Operation of the video editing device 100 will now be described using example data having specific contents.

The video editing device 100 and the external terminal 101 are connected together by the network connection unit 102. Here, the network connection unit 102 is specifically hardware, such as an Ethernet (registered trademark) port, a wireless local area network (LAN) module, or a telephone line modular, and software which controls the hardware. On the other hand, the external terminal 101 is specifically a video camera which has a means for connecting to a network as described above.

Figure 2:
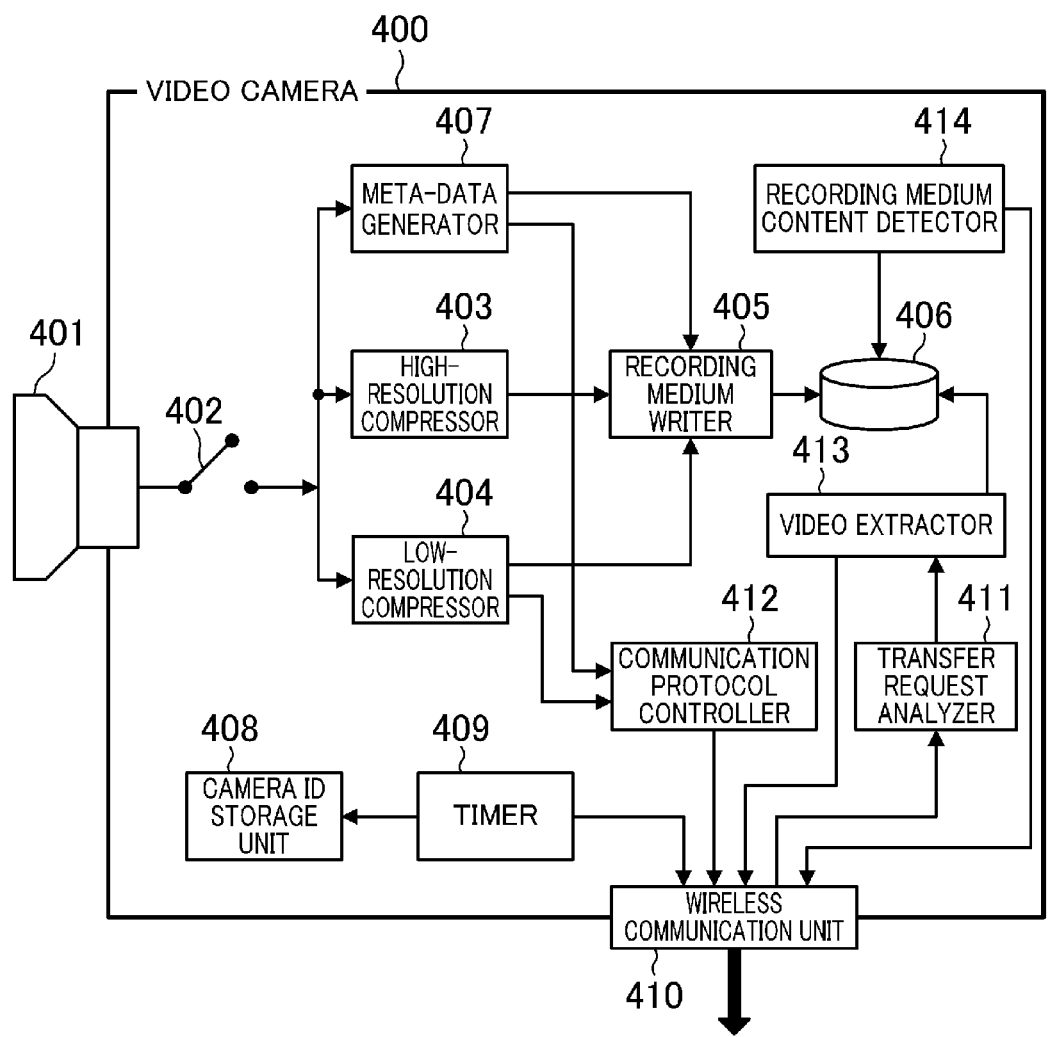
FIG. 2 is a block diagram of an external terminal (video camera) in the first embodiment.

FIG. 2 is a block diagram of a video camera as an example of the external terminal 101 of this embodiment. The video camera 400 records a captured video as a video file to a recording medium 406. The recording medium 406 is specifically hardware, such as an SD memory card inserted in a media slot of the video camera, etc.

The video camera 400 further includes an image capture unit 401. The image capture unit 401 is hardware for converting optical information into electronic information, and software for controlling the hardware, specifically an image capture device, such as a charge coupled device (CCD) or a complementary metal-oxide-semiconductor (CMOS) device, and driver software for controlling the image capture device.

The video camera 400 further includes a recording start/end instruction unit 402, a high-resolution compressor 403, a low-resolution compressor 404, and a meta-data generator 407. An output of the image capture unit 401 is input through the recording start/end instruction unit 402 to the high-resolution compressor 403, the low-resolution compressor 404, and the meta-data generator 407. Here, the recording start/end instruction unit 402 may specifically be a recording start/end button of the video camera which is pressed down by the user of the video camera. When the button is pressed once, the video camera 400 starts recording, and an output of the image capture unit 401 is input to the high-resolution compressor 403 etc. When the button is pressed once again, the video camera 400 stops recording, and the output of the image capture unit 401 to the high-resolution compressor 403 etc. is blocked.

The high-resolution compressor 403 and the low-resolution compressor 404 are software or hardware which, for example, compresses a moving image portion and an audio portion of an input video using H.264 and Advanced Audio Coding (AAC), respectively. The encoder is set or adjusted so that the high-resolution compressor 403 outputs video data at a bit rate which is higher than that at which the low-resolution compressor 404 outputs video data.

Data output by the high-resolution compressor 403 and the low-resolution compressor 404 is written as a video file to the recording medium 406 through a recording medium writer 405. Here, the recording medium writer 405 is software or hardware for writing data as a file to the recording medium 406. A specific example of the recording medium writer 405 is a file system module of an operating system, such as Windows (registered trademark) or Linux (registered trademark). Specifically, by calling a file write application programming interface (API) possessed by these operating systems, a file of interest is written to the recording medium 406. The contents of a video contained in a high-resolution video file thus written is exactly the same as the contents of a video contained in a low-resolution video file. The difference therebetween is only compression techniques or a parameter(s) used in compression.

The meta-data generator 407 is software which generates additional information about a video file recorded by the video camera 400. An output of the meta-data generator 407 is written as a meta-data file to the recording medium 406 through the recording medium writer 405. Specific contents of the written additional information will be described below.

Figure 3:
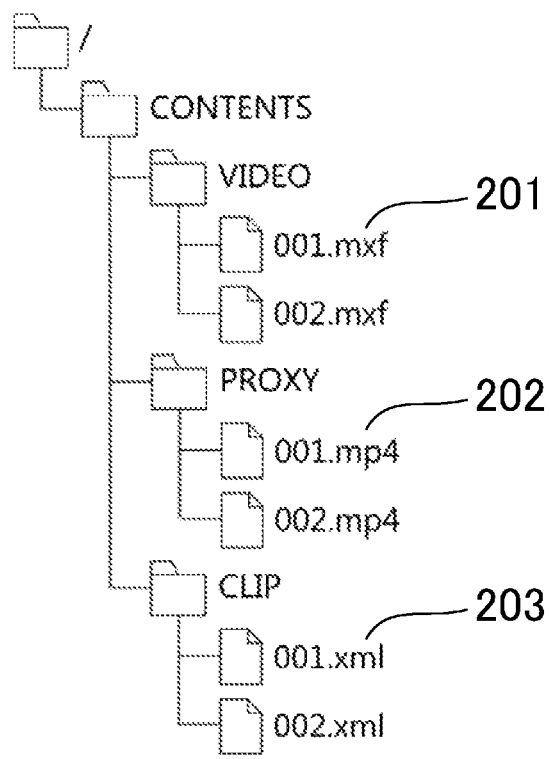
FIG. 3 is a diagram showing an example configuration of folders and files in a recording medium of a video camera.

With the above configuration, high-resolution and low-resolution video files and a meta-data file are stored in the recording medium 406. These files generated by performing recording once are stored in the recording medium 406 in association with each other. FIG. 3 shows an example configuration of files in the recording medium 406. A file system in the recording medium 406 has a CONTENTS folder in which all files recorded by the video camera 400 are stored. There are a VIDEO folder, a PROXY folder, and a CLIP folder under the CONTENTS folder. A high-resolution video file is stored in the VIDEO folder. A low-resolution video file is stored in the PROXY folder. A meta-data file is stored in the CLIP folder. When stored, a video file and a meta-data file corresponding to each other are given the same name except for the extension. In the example of FIG. 3, there is a set of a high-resolution video file named "001.mxf" stored in the VIDEO folder, a low-resolution video file named "001.mp4" stored in the PROXY folder, and a meta-data file named "001.xml" stored in the CLIP folder. Because files are associated with each other using a file name, the association can be easily recognized by humans and computers.

A high-resolution video file 201 is recorded in a file format called the Material eXchange Format (MXF): SMPTE377M. A low-resolution video file 202 is recorded in a file format called the Moving Picture Experts Group (MPEG) 4: ISO/IEC14496-14. These file formats are widely used in professional video equipment. In contrast, a meta-data file 203 is stored in the eXtensible Markup Language (XML). The XML format is a markup language which describes a content with considerably high flexibility, and therefore, is suitable for professional video equipment which is required to record various items of additional information.

FIGS. 4A and 4B show example contents of a meta-data file. All additional information is described in the tag "P2Main." Technical parameters, such as video and audio formats, are described in the tag "ClipContent." Additional information, such as the date and time of generation, equipment used in shooting, and a memo, are described in the tag "ClipMetadata."

Of the additional information shown in FIGS. 4A and 4B, particularly important is a "GlobalClipID." The "GlobalClipID" is ID information for uniquely identifying a video associated with this meta-data file. This ID information is a character string having a sufficient length of alphanumeric characters. A predetermined algorithm is used to generate this type of ID information so that different ID information can always be assigned to different video files. A specific example of the algorithm for generating GlobalClipIDs is the Unique Material Identifier (UMID): SMPTE330M, which is a standard for providing material identifiers in the broadcasting business.

The reason why ID information, such as UMID, is generated and written to a meta-data file is that, in the recording medium 406, the file name of a video file cannot be used to uniquely identify the video file in a place away from the recording medium in which the video file is stored. This is more significantly true when the file system MS-DOS (registered trademark), which is employed for SD cards etc., is used as a file system for the recording medium 406. In this file system, file names have at most eight alphanumeric characters. It is obvious that file names are too short to be uniquely assigned to all video files generated all over the world. It is not unusual that two different recording media store video files which have the same name but contain different contents. Therefore, for example, when data is collected and copied from a plurality of recording media to a single recording medium, conflicting file names need to be changed. In other words, file names are not always unique ID information for videos. Therefore, the above UMID is employed.

Note that a high-resolution video file and a low-resolution video file associated with this meta-data file contain the same contents of a video as described above, and therefore, are assigned the same ID information.

A meta-data file contains, in the tag "Device," information about equipment which has generated a video file associated with the meta-data file. A piece of equipment which has generated a video file can be uniquely identified based on a set of the serial No. ("SerialNo."), model name ("ModelName"), and manufacturer ("Manufacturer") of the equipment.

Referring back to FIG. 2, the video camera 400 further includes a communication protocol controller 412 and a wireless communication unit 410. The video camera 400 transfers a low-resolution video file and a meta-data file to the video editing device 100 through the communication protocol controller 412. Here, the communication protocol controller 412 is software which transfers electronic data from the video camera 400 to the video editing device 100 in cooperation with the proxy video receiver 103 included in the video editing device 100. A specific example of the communication protocol controller 412 is File Transfer Protocol (FTP) client software etc. The wireless communication unit 410 is hardware which is used by the communication protocol controller 412 to transfer electronic data. Specific examples of the wireless communication unit 410 include a wireless LAN module, a 4G/LTE connection adaptor, etc.

The video camera 400 further includes a camera ID storage unit 408 and a timer 409. The camera ID storage unit 408 is hardware or software which stores ID information for uniquely identifying an individual video camera. A specific example of the camera ID storage unit 408 is a flash read only memory (ROM) memory chip which stores the model name or serial No. of a video camera. The timer 409 is software or hardware which informs the external terminal manager 125 included in the video editing device 100 of the camera ID stored in the camera ID storage unit 408, through the wireless communication unit 410 at predetermined time intervals. For example, when the external terminal manager 125 is server software which waits at a particular Transmission Control Protocol (TCP) port, the timer 409 transmits the text data of FIG. 5 to the particular port through TCP communication at predetermined time intervals. The external terminal manager 125 stores a pair of the IP address of the transmission source of the text data and the camera ID (which is the same as the camera information described in a meta-data file, i.e., the serial No. ("SerialNo."), model name ("ModelName"), and manufacturer ("Manufacturer") of the equipment in the example of FIG. 5) described in the text data. As a result, it can be managed or determined what IP a particular video camera is associated with.

On the other hand, the video editing device 100, which includes the proxy video receiver 103, receives a low-resolution video file and a meta-data file associated with the low-resolution video file from the video camera 400. The video editing device 100 stores the received low-resolution video file into the first recording medium 104. The video editing device 100 analyzes and records the contents of the meta-data file to the proxy database 105.

As described above, the proxy video receiver 103 is software having a function of transferring electronic data in cooperation with the communication protocol controller 412 included in the video camera 400. An example of this function is a function of an FTP server.

The proxy video receiver 103 also has a function of analyzing the contents of a meta-data file. An example of this function is a function of an XML parser. The XML parser is used to extract necessary information from the meta-data file of FIGS. 4A and 4B.

Here, the necessary information extracted from the meta-data file is information necessary for finding what a low-resolution video file stored in the first recording medium 104 originates from. In the example of FIGS. 4A and 4B, a specific example of the necessary information is ID information for identifying a video file, that is described in the tag "GlobalClipID." Information about equipment for shooting, that is described in the tag "Device," is also information about the external terminal 101 in which a recording medium storing main-track video data associated with the meta-data file is most likely to be inserted. These items of information are recorded by the proxy video receiver 103 to the proxy database 105 in association with information about a path to a proxy video file stored in the first recording medium 104. With the above configuration, ID information for identifying a video can be used as a search key to easily search for information for identifying the location of a proxy video file related to the video in the first recording medium 104, or the external terminal 101 which is highly likely to have a recording medium which stores a main-track video file related to the video.

Figure 6:
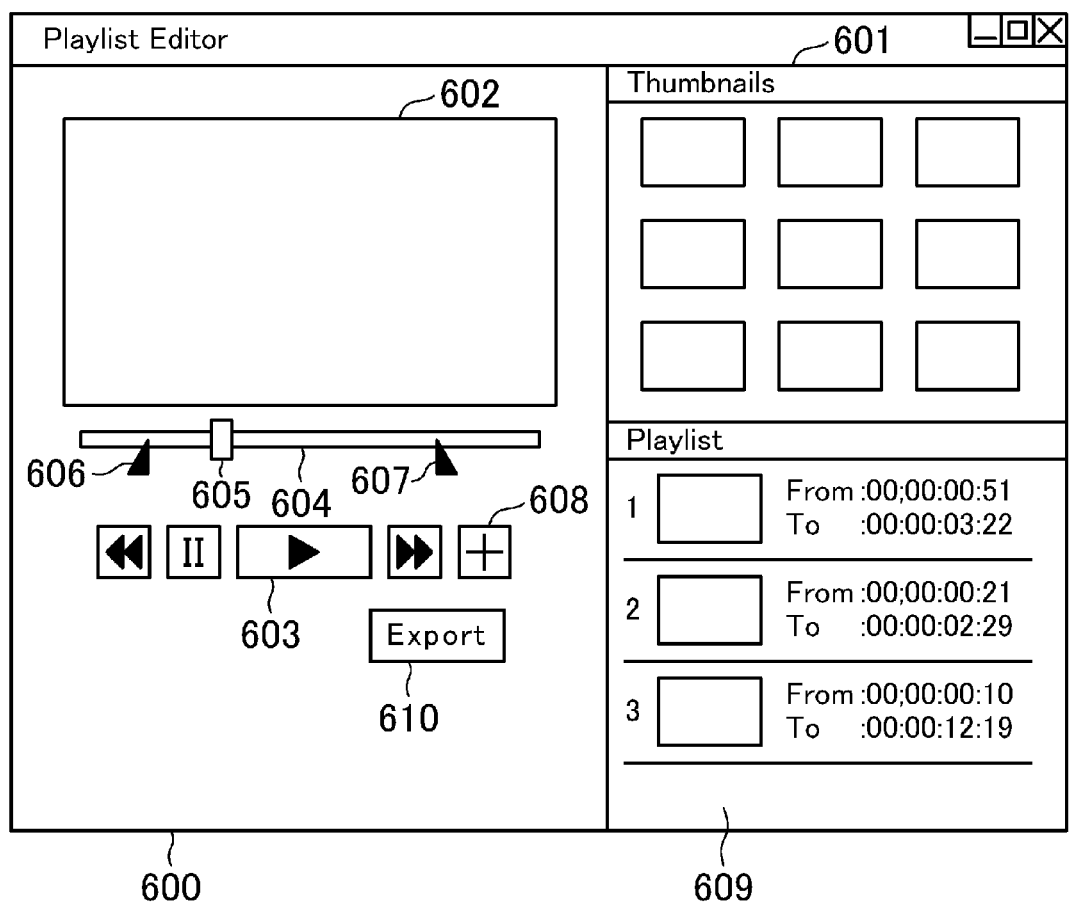
FIG. 6 is a diagram showing an example screen of a playlist generation application.

The user 123 of the video editing device 100 of the present disclosure can generate a playlist while browsing a proxy video stored in the first recording medium 104, using the playlist generator 106 included in the video editing device 100. FIG. 6 shows an example screen which is displayed when the playlist generator 106 is implemented as a web application which the user 123 can use through a network.

The user accesses the playlist generator 106 through a web browser 600 using their own computer etc. The playlist generator 106, which has a web server function, serves as a web application which provides a function of generating a playlist.

A playlist generation application in this embodiment includes a thumbnail display portion 601 which displays a list of proxy video files stored in the first recording medium 104 in a thumbnail format. The user 123 can select a video which the user 123 desires to browse by clicking a corresponding thumbnail. A proxy video related to the video selected by the user in the thumbnail display portion 601 is played back in a proxy playback portion 602. The user can pause or fast-forward a video displayed in the proxy playback portion 602 by clicking a playback operation button 603. A playback position display bar 604 visualizes where a frame currently displayed in the proxy playback portion 602 is positioned in a video file. The user 123 can cause a video to be in any temporal position in a video file by dragging a pointer 605 on the playback position display bar 604.

The user specifies a necessary range of a video in a video file using the playback operation button 603 or the playback position display bar 604. Specifically, a range for which the user desires to obtain high-resolution video data is specified by dragging a start point indicator 606 and an end point indicator 607 displayed along the playback position display bar 604. After the specifying of the range has been completed, the range of the video is added to a playlist by clicking a range playlist addition button 608. The added range of the video is displayed in a list format in a playlist display portion 609.

The user 123 repeatedly performs a series of steps, i.e., selecting a video file, specifying a necessary range, and adding to a playlist, to complete generation of a playlist which is a list of necessary video ranges.

After the generation of a playlist has been completed, the playlist generator 106 outputs the contents of the playlist to the playlist analyzer 107. Specifically, when the user clicks an export button 610 included in the playlist generation application, text data shown in FIG. 7 is output to the playlist analyzer 107.

In the example of FIG. 7, a playlist is expressed in the XML format. A character string described in the tag "UserEditListName" is ID information for uniquely identifying the playlist. For example, if all playlists generated by the video editing device 100 are assigned serial Nos., the serial Nos. can be satisfactorily used as identifiers (IDs) for the playlists in the video editing device 100.

Information about a list of specified video ranges is described in the tag "EventList." The tags "Event" immediately below the tag "EventList" each indicate a range specified for a corresponding video file. The tag "Offset" immediately below the tag "Event" indicates the time point (unit: "frame") on the time axis of the playlist at which the specified range begins. The tag "Duration" indicates the length of time (unit: "frame") that the video continues from that time point. Specifically, in the example of FIG. 7, the first one of the tags "Event" indicates that a specified range of a video indicated in the tag "Source" continues from the beginning (Offset=0) of the playlist to the 61st frame (Duration=61). In this example, the tag "Source" has a description that the start point of a video file whose GlobalClipID is "060A2B3401010-10501010D4313000000A50A306F446605EB00804582FC-F7D003" is the 51st frame (Offset=51). Specifically, the first specified range of a video contained on the playlist continues from the 51st frame to the 112th frame of the video file whose GlobalClipID is "060A2B340101010501010D431300000-0A50A306F446605EB00804582FCF7D003." The second one of the tag "Event" can be similarly analyzed.

FIG. 8 shows specified ranges of videos indicated by the XML file of FIG. 7.

The playlist analyzer 107 initially extracts, from an input playlist, ID information for uniquely identifying video data, and range specifying information related to the video. In the example of FIG. 7, extracted are the value of "GlobalClipID" as the video ID information, and the value of "Duration" and the value of "Offset" below the tag "Source" as the range specifying information. The playlist analyzer 107 also looks the extracted video ID information up in the proxy database 105. As described above, the proxy database 105 can be used to search for information for identifying an external terminal which is highly likely to have a recording medium which stores a main-track video file related to the video, using the video ID information as a search key. In this embodiment, information about the serial No., model name, and manufacturer of a video camera which was used to capture the corresponding video data is obtained. Thus, the information for identifying an external terminal and the video ID information, which have been obtained by the playlist analyzer 107, are input to the extraction command issuance unit 109.

The extraction command issuance unit 109 is software which issues, through a network, a command to the external terminal 101 to transfer main-track video data. Specifically, the extraction command issuance unit 109 generates text data, such as, for example, that shown in FIG. 9, based on an output of the playlist analyzer 107, and transmits the text data to the external terminal 101. Note that, in this example, a value stored in the tag "CommandID" is an identifier which is uniquely assigned to each command issued by the extraction command issuance unit 109. A location (e.g., an IP address) in a network of an external terminal as a transmission source may be obtained by querying the external terminal manager 125 using information for identifying an external terminal, that has been received from the playlist analyzer 107, as a key. Commands may be transmitted by, for example, when a transfer request analyzer 411 which is software which waits for a command in the video camera 400 is a server which waits at a particular port of TCP, transmitting the text data of FIG. 9 to the particular port. In this example, it is assumed that one command is issued for specifying of each range. Alternatively, when the same external terminal is requested to transfer a plurality of ranges, a single command indicating these ranges may be issued.

Note that when no external terminal that matches the ID for identifying the external terminal 101 has been found on the network, the extraction command issuance unit 109 informs the reception error detector 112 of the error.

On the other hand, as shown in FIG. 2, the video camera 400, when receiving the command to transfer main-track video data, analyzes the details of the command using the transfer request analyzer 411. In this example, the values of "GlobalClipID," "Offset," and "Duration" are extracted using the XML parser. These extracted values are input to the video extractor 413.

The video extractor 413 initially searches the recording medium 406 inserted in the video camera 400 for a specified video ID, i.e., main-track video data corresponding to GlobalClipID in this example. Thereafter, if the main-track video data has not been found, the video editing device 100 is informed of the error through a network. The error information received by the video editing device 100 is processed by the reception error detector 112.

If the main-track video data has been found, the video extractor 413 reads the main-track video data from the recording medium 406 to obtain video data extracted from the specified range. Specifically, in the case of the example command of FIG. 9, new video data of the 51st frame to the 112th frame of the main-track video file whose GlobalClipID is "060A2B340101010501010D4313000000A50A306F4466-05EB00804582FCF7D003" is obtained. Thereafter, the video data is transferred to the video editing device 100 using the wireless communication unit 410. As a specific example technique for performing this transfer, when the main-track video receiver 110 included in the video editing device 100 may be software having the FTP server function, the video extractor 413 may function as an FTP client to transfer video data. The value of "CommandID" assigned to the command may be directly used as the character string of a transfer file name which is used in the transfer. This is because the main-track video receiver 110 included in the video editing device 100 can easily determine what command issued by the extraction command issuance unit 109 the received main-track video data has been transferred in accordance with.

Figures 9, 10:
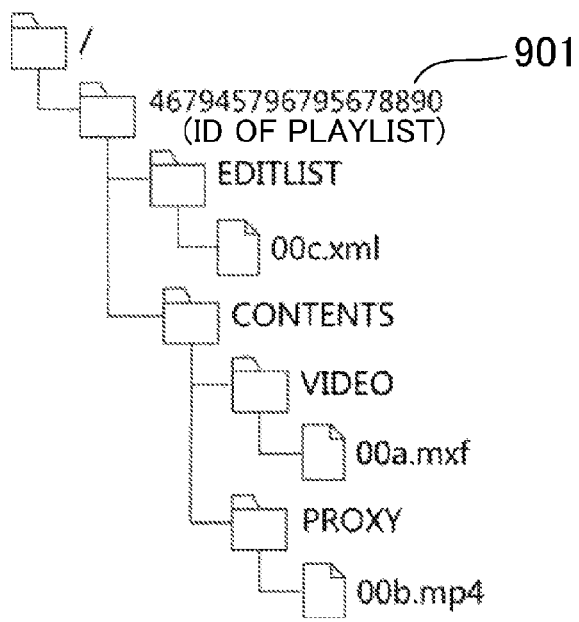
FIG. 9 is a diagram showing an example command which is transmitted from a video editing device to a video camera.
FIG. 10 is a diagram showing an example configuration of folders and files in a second and a third recording medium of FIG. 1.

The main-track video receiver 110 included in the video editing device 100 is software which receives main-track video data which is transferred by the video extractor 413 included in the video camera 400 through a network. As described above, an example of the main-track video receiver 110 is FTP server software. The main-track video receiver 110 also stores the received main-track video data as a video file in the second recording medium 115. FIG. 10 shows an example technique of storing a video file in the second recording medium 115. In the root folder of the second recording medium 115, a folder 901 whose folder name is the ID information of a playlist (in this embodiment, a character string described in the tag "UserEditListName" of the playlist) is generated. A CONTENTS folder is generated immediately below the folder 901. A video file related to a playlist having ID information after which the folder 901 is named is stored in the CONTENTS folder. A VIDEO folder is generated immediately below the CONTENTS folder. The received main-track video data is stored in the VIDEO folder. In this example, one of video files generated from main-track video data obtained from a video camera is stored in the file name of "00a.mxf". When a plurality of pieces of main-track video data have been obtained, video files having different file names are generated and stored in the VIDEO folder.

If all main-track video files have been successfully obtained, the playlist changing unit 114 rewrites a playlist generated by the playlist generator 106 in a format shown in FIG. 11, and stores the resultant playlist to the third recording medium 121. This playlist is different from the playlist (FIG. 7) output by the playlist generator 106 in that a video file in the tag "Source" is specified using "Name" (this indicates the file name of a main-track video file in the second recording medium 115) instead of using "GlobalClipID." This is because main-track video which the video camera 400 has transferred to the video editing device 100 contains only an extracted necessary portion. The manipulation of a video (i.e., extraction of a portion from the video) causes the contents of a video indicated by GlobalClipID used in FIG. 7 to differ from the contents of a main-track video file stored in the second recording medium 115. Therefore, GlobalClipID used on the playlist of FIG. 7 as information for specifying main-track video stored in the second recording medium 115 cannot be used. Instead, on the playlist of FIG. 11, a file name used in storing main-track video data in the second recording medium 115 is used as information for specifying a main-track video file. Note that this file specifying technique is merely an example. Alternatively, for example, a new GlobalClipID may be generated and used in association with a main-track video file in the second recording medium 115.

On the playlist of FIG. 11, all the values of "Offset" immediately below the tags "Source" are "0." This is because main-track videos transferred by the video camera 400 to the video editing device 100 each contain only an extracted necessary portion. Main-track video data which has been transferred from the video camera 400 and stored in the second recording medium 115 has been obtained by removing a portion preceding a range specified by the user on the playlist of FIG. 7. Therefore, on the playlist of FIG. 11, the value of "Offset" needs to be set to "0."

Note that the above process of rewriting the contents of a playlist which is performed by the playlist changing unit 114 even when main-track video data has been successfully obtained is necessary because only a necessary portion is extracted in order for the video camera 400 to transfer main-track video to the video editing device 100. If the video camera 400 is configured to transfer the entirety of a main-track video file identified by a specified video ID, the playlist changing unit 114 does not necessarily need to rewrite a portion of a playlist for which main-track video has been successfully obtained.

FIG. 10 also shows an example technique of storing a playlist output by the playlist changing unit 114. In this embodiment, it is assumed that the second recording medium 115 and the third recording medium 121 are the same recording medium. In this case, an EDITLIST folder is generated immediately below the folder 901 whose folder name is the ID of a playlist, and a playlist file is stored in the EDITLIST folder. With such a folder configuration and file configuration, the association of a playlist with a video file contained in the playlist is clearly recognized by the eyes of humans.

On the other hand, the reception error detector 112 is software or hardware which detects a failure in a request for transfer of main-track video data which is issued by the extraction command issuance unit 109. A failure to obtain main-track video data is typically caused, as described above, when the external terminal 101 to which the extraction command issuance unit 109 tries to issue a command does not exist on the network, or when the video extractor 413 determines that main-track video data requested by the extraction command issuance unit 109 does not exist in the recording medium 406 included in the video camera 400. The reception error detector 112, when informed that main-track video data has not been successfully obtained for the above reason, informs the video supplementation unit 113 of the ID information of the video data which has not been successfully obtained.

The video supplementation unit 113 copies a proxy video file corresponding to the video ID received from the reception error detector 112, from the first recording medium 104 to the second recording medium 115. FIG. 10 shows an example technique of copying a proxy video file. In FIG. 10, a PROXY folder is generated below the above CONTENTS folder, and a proxy video file is copied to the PROXY folder under the name "00b.mp4". Because a proxy video file is stored in a folder which is different from a VIDEO folder in which a main-track video file is stored, it can be clearly recognized what video file is a main-track video file and what video file is a proxy video file.

When main-track video data has not been successfully obtained, the reception error detector 112 informs the playlist changing unit 114 of the video ID information of the video data which has not been successfully obtained. The playlist changing unit 114 changes and rewrites the contents of a playlist generated by the playlist generator 106 so that a proxy video file is referred to instead of the main-track video data which has not been successfully received, and stores the resultant playlist in the third recording medium 121.

FIG. 12 shows an example playlist which has been rewritten by the playlist changing unit 114. It is assumed that, of the video data information of which is contained in the playlist of FIG. 7, a first main-track video file has been successfully obtained, while a second main-track video file has not been successfully obtained. A description of the first video file (00a.mxf) is the same as that in the above-described playlist (FIG. 11) which is generated when a main-track video file has been successfully obtained. In contrast, in a description of the second video file, attribute information "Proxy="yes"" is added to the tag "Source." The presence of this attribution information indicates that only a proxy video has been obtained for the video. In the tag "Name," the file name of a proxy video file copied to the second recording medium 115 is specified. In the example file configuration of FIG. 10, such a file name is the file name of a file stored in a PROXY folder. In this embodiment, a proxy video file which is stored in the first recording medium 104 is configured to be simply copied to and stored in the second recording medium 115, and therefore, the value of "Offset" is not changed.

The value of "GlobalClipID" is described in the tag "Source." This is in order to, when, for example, the recording medium 124 which used to be inserted in the external terminal 101 is physically brought to the user 123, easily detect a correspondence between a main-track video file stored in the recording medium 124 and a video missing from a playlist possessed by the user 123. By checking "GlobalClipID" described in a meta-data file in the recording medium 124 against "GlobalClipID" described in a playlist, main-track data which is missing from the playlist can be mechanically and easily extracted.

With the above configuration, a playlist stored in the third recording medium 121 refers to a high-resolution video for a portion for which a main-track video file has been successfully obtained, and a low-resolution video instead of a high-resolution video for a portion for which a main-track video file has not been successfully obtained. Therefore, a video as a result of playback of the playlist has best quality that can be obtained through a network at that time.

When main-track video data has not been successfully obtained, the reception error detector 112 informs the missing video manager 119 of four items of information, i.e., "the video ID information of video data which has not been successfully obtained," "the file name of a proxy video substituted for that video," "the start and end points of a range specified in a playlist for that video," and "the ID of the playlist containing that video data." The missing video manager 119 records these items of information to the missing video database 120. As a result, for a particular video ID, it can be easily determined whether or not there is any playlist for which main-track video data has not been successfully obtained, and if any, what playlist it is, and what portion of the video is necessary on the playlist. This is used in an arrangement for automatically repairing missing main-track video data, which will be described below.

The video editing device 100 further includes the network storage provider 116. The network storage provider 116 is software which allows the user 123 to refer to the contents of the second recording medium 115 and the third recording medium 121 through a network. Specifically, an example of the network storage provider 116 is server software which supports a protocol used for providing an online storage, such as a SAMBA server, an Network File System (NFS) server, or a Web-based Distributed Authoring and Versioning (WebDAV) server. The network storage provider 116 allows the user to copy a video having best quality that can be available at that time, to their own computer through a network.

Next, an arrangement for automatically repairing main-track video data missing from the second recording medium 115 will be described.

The video camera 400 further includes a recording medium content detector 414. The recording medium content detector 414 is software which scans all main-track video files stored in the recording medium 406 of the video camera 400 to generate a list of video ID information of the main-track video files, and transmits the list to the video editing device 100 through a network. The recording medium content detector 414 may perform the above operation, for example, at a timing when an event, such as "network connection is established between a video camera and a video editing device" or "a new recording medium is inserted into a video camera," is detected. FIG. 13 shows example information which is transmitted from the recording medium content detector 414 to the video editing device 100 at this time. Information for uniquely identifying a video camera as a transmission source is described in the tag "Device." The tag "Clip" corresponds to each main-track video file stored in the recording medium 406, and "GlobalClipID" is ID information for uniquely identifying the video. Specifically, the example of FIG. 13 shows that three main-track video files are stored in the recording medium 406. Note that the tag "Shot" described in this example is used to, when a plurality of video files are generated by performing recording operation once (e.g., a video is recorded to a plurality of recording media because the recording time is long, video data to be recorded has a size exceeding an upper file size limit of a file system employed in a recording medium, etc.), collect these video files, and define the order in which the video files are to be played back.

Note that, as a technique of transmitting the information, for example, when the external terminal content information obtaining unit 118 which is software for waiting for the information in the video editing device 100 is a server which waits at a particular port of TCP, the text data of FIG. 13 may be transmitted to the particular port.

Information transmitted from the recording medium content detector 414 of the video camera 400 is received and processed by the external terminal content information obtaining unit 118 in the video editing device 100. The external terminal content information obtaining unit 118 analyzes the received information to look video ID information contained therein up in the missing video manager 119. As described above, the missing video manager 119, which includes the missing video database 120, can easily determine, using a particular video ID as a search key, whether or not there is any playlist for which the main-track video data has not been successfully obtained, and if any, what playlist (playlist ID) it is and what portion of the video is necessary on the playlist.

If, as a result of the looking up, it is determined that the recording medium 406 of the video camera 400 contains video data for which the video editing device 100 has failed to obtain main-track video data, the video editing device 100 performs the following operation for each piece of such video data.

The external terminal content information obtaining unit 118 included in the video editing device 100 informs the main-track video extractor 108 of information obtained from the missing video manager 119, i.e., "video ID information," "the file name of a proxy video file substituted for the video," "the start and end points of a specified range of the video on a playlist," and "the ID of the playlist containing the video data," and information for uniquely identifying a video camera which has transmitted a list of video IDs (in this embodiment, information described in the tag "Device" of FIG. 13)."

The extraction command issuance unit 109 included in the main-track video extractor 108 commands, through a network, a designated external terminal to start transfer of video data of a main-track video which has been received from the missing video manager 119. An example technique of identifying a location on a network of an external terminal to which a command is to be issued, and an example command to be transmitted, are the same as those described above which are used in processing an output of the playlist analyzer 107.

The operation of the video camera 400 which is performed when the above transfer start command is received is also the same as when a command which originates from an output of the playlist analyzer 107 is processed as described above (i.e., the command of FIG. 9 is processed). A necessary portion of main-track video data which has been extracted by the video extractor 413 included in the video camera 400 is transmitted to the main-track video receiver 110 included in the video editing device 100.

Figure 14:
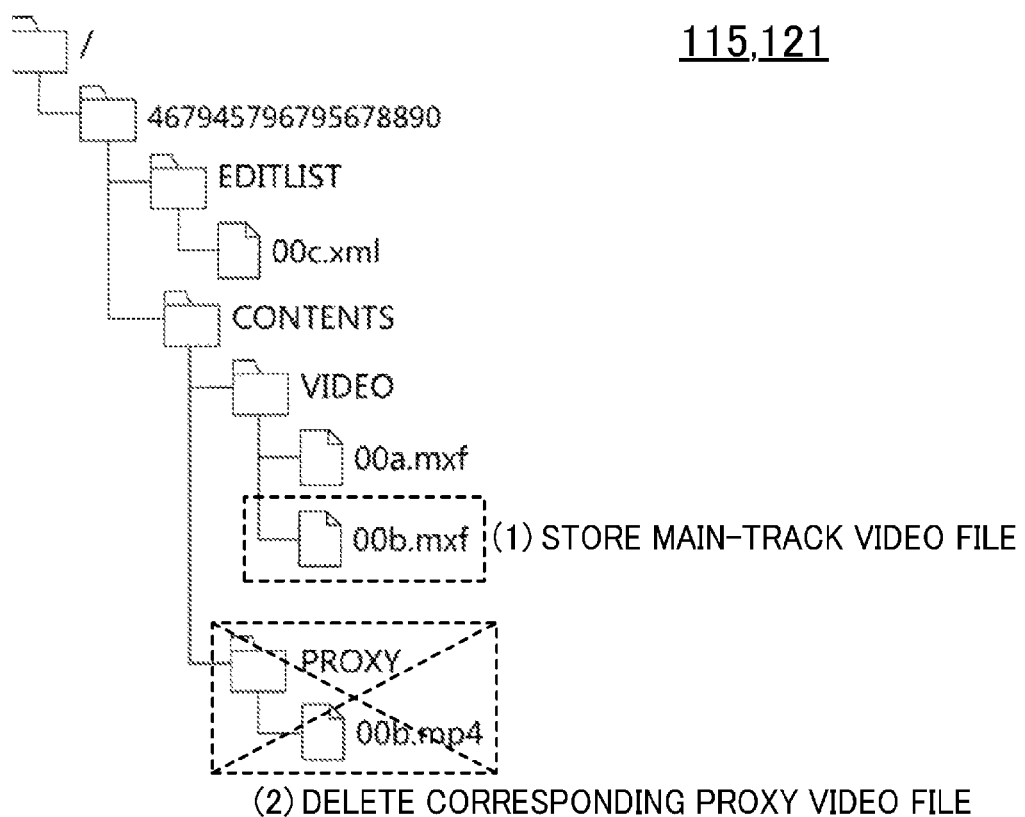
FIG. 14 is a diagram showing replacement of a proxy video file with a main-track video file in the second and third recording media of FIG. 1.

The main-track video receiver 110 which has received the main-track video data initially searches the second recording medium 115 for a folder which stores video data related to a playlist ID which has been received from the external terminal content information obtaining unit 118. In this embodiment, as described above, a folder whose folder name is the ID of a playlist is generated in the root folder of the second recording medium 115, and therefore, the folder can be easily accessed. Next, the main-track video receiver 110 stores newly obtained main-track video data as a video file immediately below a VIDEO folder, and deletes a proxy video file which has been substituted (FIG. 14). As a result, the configuration of folders and files is the same as when all main-track video data has been successfully obtained from the beginning The playlist changing unit 114 also changes the contents of a playlist having a playlist ID received from the external terminal content information obtaining unit 118, the playlist being stored in the third recording medium 121, to add the change to the third recording medium 121. Here, the term "add the change" means overwriting an existing playlist with a new playlist to store the new playlist. The change which the playlist changing unit 114 performed on a playlist in the third recording medium 121 means that a description of a proxy video which has been substituted for a main-track video in a playlist is rewritten to a description of a newly obtained main-track video file.

The above playlist of FIG. 12 will be described as an example. In this example, for the second video on the playlist, a proxy video file named "00b.mp4" is used instead of main-track video data. This can be determined based on an attribute denoted as "proxy="yes"" attached to the tag "Source." In this situation, it is assumed that a main-track video related to this video has been newly obtained. As described above, it is assumed that the video camera 400 transmits only a specified range or portion extracted from main-track video data to the video editing device 100. The playlist changing unit 114 recognizes that the newly obtained main-track video file is related to the second video on the playlist, based on information (in this case, particularly, the file name of a proxy video file which is substituted) which has been received from the missing video manager 119. Therefore, the playlist changing unit 114 deletes the proxy attribute from the tag "Source" which is a description of the video, deletes the tag "GlobalClipID," and sets the value of "Offset" to "0." The reason why the tag "GlobalClipID" is deleted and "Offset" is set to "0" in order to refer to main-track video data is that which has been described above. Thereafter, the file name described in the tag "Name" is rewritten to the file name of the newly obtained main-track video file in the second recording medium 115. For example, in this example, if it is assumed that the file name is "00b.mxf," the playlist of FIG. 12 modified by the playlist changing unit 114 is the same as the playlist of FIG. 11.

When the playlist changing unit 114 has changed an existing playlist, then if a change has occurred in the quality of a video which is to be provided to the user 123, the video editing device 100 transmits an informative mail to the user 123 using the external electronic mail server 122. This is in order to allow the user 123 to quickly know that a high-resolution video is available.

[1-3. Advantages Etc.]

With the above configuration, a video editing device can be constructed so that even if the video editing device has failed to obtain high-resolution video data, because, for example, a recording medium has been removed from a video camera, the user can obtain a best editing result that is available at that time. Also, the video editing device can automatically search for the high-resolution video data which the video editing device has failed to obtain, on a network, and adds a change to the editing result.

Note that the number of pixels per video frame is predicted to continue to increase. Therefore, even if the transmission speed of a communication network is further increased in the future, the above usefulness of low-resolution video data is expected not to decrease.

[Second Embodiment]

[2-1. Configuration of System]

In the first embodiment, the external terminal content information obtaining unit 118 included in the video editing device 100 is assumed to be software which obtains, using a network, a list of the ID information of main-track video data stored in the recording medium 124 included in the external terminal 101 connected to the video editing device 100 through a network. However, a large number of main-track video files may be stored in the recording medium 124. Therefore, problems may arise, such as that the size of data which the external terminal content information obtaining unit 118 exchanges with the external terminal 101 becomes large, and that the number of video IDs for which the external terminal content information obtaining unit 118 queries the missing video manager 119 becomes large.

With this situation in mind, as a simple technique, missing video may be managed for each recording medium of the external terminal 101. This technique is based on the following idea. In a place where shooting is performed, it is less likely that main-track video data is moved from one recording medium to another recording medium. Therefore, if a recording medium has been successfully identified, a video file stored therein may be guessed.

Figure 15:
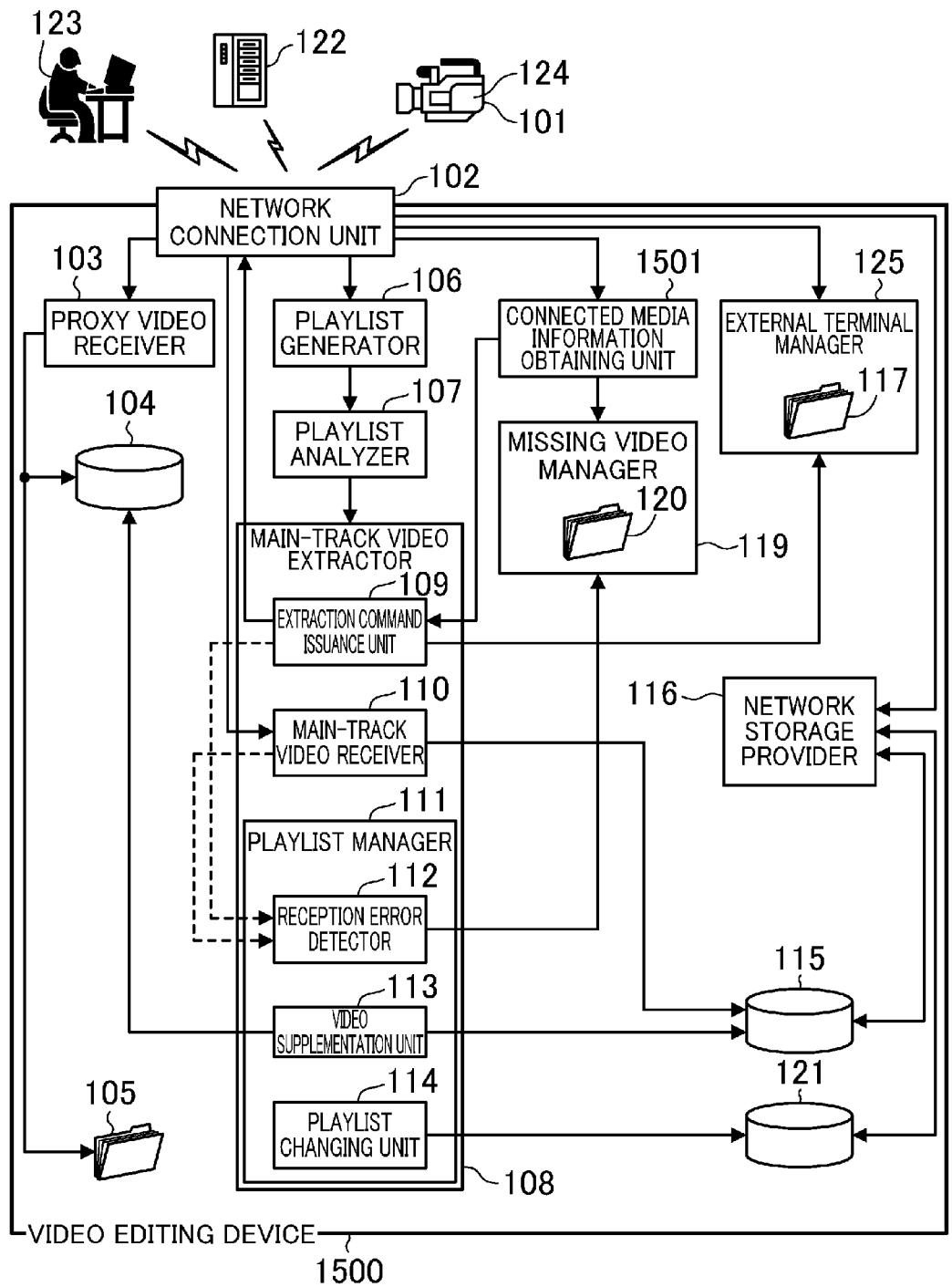
FIG. 15 is a block diagram of a video editing device according to a second embodiment.

FIG. 15 is a block diagram of a video editing device according to this embodiment. Note that, in FIG. 15, blocks having the same functions as those of FIG. 1 are indicated by the same reference characters. A system configuration of the video editing device 1500 of this embodiment will now be described, indicating differences from the first embodiment.

In the first embodiment, the reception error detector 112, when informed that a reception error has occurred, informs the missing video manager 119 of ID information for uniquely identifying a main-track video which has not been successfully received, a range of the main-track video data which has been selected by the user, and the ID of a playlist which used to contain the range of the main-track video data. However, in this embodiment, the reception error detector 112 additionally informs the missing video manager 119 of the ID of a recording medium which stores a main-track video which has not been successfully received.

In the missing video database 120 included in the missing video manager 119, the video ID information which has been received from the reception error detector 112, a range of the main-track video data which has been selected by the user, the ID of a playlist which used to contain the range of the main-track video data, and the ID of a recording medium which contains the main-track video, are registered. The database thus constructed can be easily searched and referenced using the ID of a particular recording medium as a search key to determine whether or not there is any main-track video data which the video editing device 1500 has failed to obtain, of those which are presumed to be stored in the recording medium, and if any, what video ID the video has and what portion of the video has been selected.

The video editing device 1500 includes a connected media information obtaining unit 1501. The connected media information obtaining unit 1501 is software which obtains, using a network, ID information for uniquely identifying the recording medium 124 included in the external terminal 101 connected to the video editing device 1500 through a network. Here, the ID information for uniquely identifying the recording medium 124 is, for example, a character string expressing the manufacturer and serial No. of the recording medium. The ID of a recording medium may be obtained by the connected media information obtaining unit 1501 querying the external terminal 101 at a timing when connection between the external terminal 101 and the video editing device 1500 is established and thereafter information of the external terminal 101 is registered in the external terminal database 117, or at regular timings, or alternatively, by the external terminal 101 informing the connected media information obtaining unit 1501 of the ID thereof at a timing when connection to a network is established, at a timing when the recording medium 124 is inserted or removed, or at regular timings.

The connected media information obtaining unit 1501 also has a function of comparing the ID information of a recording medium inserted in an external terminal, that has been obtained by the above procedure, with the ID information of recording mediums which is registered in the missing video manager 119, and if there is matching ID information, informs the extraction command issuance unit 109 of information necessary to access the external terminal having the recording medium, the ID of a main-track video data presumed to be stored in the recording medium having the ID, and information of a selected range and the ID of a playlist in which missing has occurred, that are registered in the missing video manager 119 in association with the video data.

With the above configuration, the location of main-track video data to be obtained is determined based on the ID of a recording medium instead of a list of video IDs, whereby the total amount of information exchanged between the external terminal 101 and the video editing device 1500, and the load on the missing video database 120, can be reduced compared to the first embodiment.

[2-2. Operation]

Operation of the video editing device 1500 will now be described, showing example data having specific values. In particular, differences from the first embodiment will be described.

As described above, information of which the reception error detector 112 informs the missing video manager 119 includes, in addition to those described in the first embodiment, the ID of a recording medium which stores a main-track video which has not been successfully received. In this embodiment, the ID information of a recording medium storing video data is described in a meta-data file which is transmitted from the external terminal 101 together with a proxy video file and is received by the video editing device 1500 using the proxy video receiver 103. The ID information of a recording medium storing video data is information described in the tag "Media" in the example meta-data of FIGS. 4A and 4B. Here, the ID information of a recording medium storing video data, i.e., ID information for uniquely identifying a recording medium (hereinafter referred to as recording medium ID information) includes a set of the manufacturer name ("Manufacturer"), serial No. ("SerialNo."), and model name ("ModelName") of the recording medium.

The proxy video receiver 103 analyzes the contents of a meta-data file, and records, to the proxy database 105, the above recording medium ID information as information for identifying a recording medium storing a main-track video file corresponding to a received proxy video file, in addition to the information described in the first embodiment. The proxy database 105 thus configured makes it easy to search, using ID information for identifying a video as a search key, not only for information for identifying the location in the first recording medium 104 of a proxy video file related to the video or an external terminal which is highly likely to have a recording medium storing a main-track video file related to the video, but also for information for identifying a recording medium which is highly likely to store a main-track video file.

As described above, the reception error detector 112, when informed that a reception error has occurred, informs the missing video manager 119 of "the ID of a recording medium storing a main-track video which has not been successfully received" in addition to the information described in the first embodiment. The recording medium ID which the missing video manager 119 is to be informed of can be easily obtained from the proxy database 105 using the ID of a video which has not been successfully obtained as a search key.

With the above configuration, the missing video database 120 included in the missing video manager 119 stores five items of information, i.e., "the video ID information of video data which has not been successfully obtained," "the file name of a proxy video which is substituted for that video," "the start and end points of a range of that video specified in a playlist," "the ID of a playlist which used to contain that video data," and "the ID of a recording medium presumed to store that video data." As a result, for a particular recording medium ID, it can be easily determined whether or not there is any video which the video editing device 1500 has failed to obtain, of main-track video data presumed to be stored in the recording medium, and if any, what video it is, what playlist the video is put on, and what portion of the video is necessary on the playlist.

Figure 16:
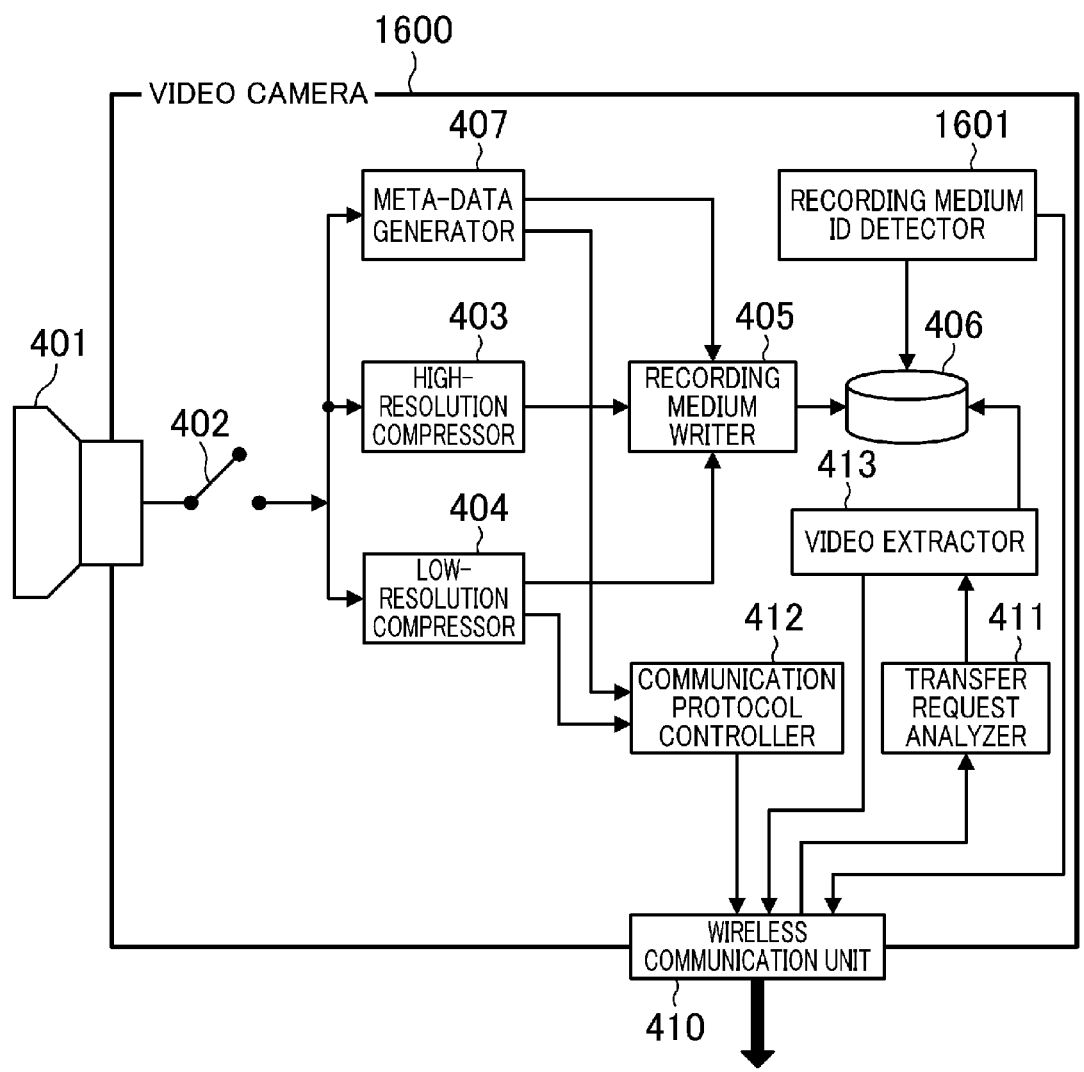
FIG. 16 is a block diagram of an external terminal (video camera) in the second embodiment.

FIG. 16 is a block diagram of a video camera 1600 which is an example external terminal in this embodiment. In FIG. 16, blocks having the same functions as those of FIG. 2 are indicated by the same reference characters.

The video camera 1600 includes a recording medium ID detector 1601. The recording medium ID detector 1601 is software which detects the recording medium ID of a recording medium 406 of the video camera 1600, and transmits the information to a video editing device 1500 through a network. The recording medium ID detector 1601 may, for example, perform the above operation at a timing when an event is detected, such as "that network connection is established between the video camera 1600 and the video editing device 1500" or "that a new recording medium 406 is inserted into the video camera 1600." FIG. 17 shows example information which is, at that time, transmitted from the recording medium ID detector 1601 to the video editing device 1500. Information for uniquely identifying a video camera which is a transmission source is described in the tag "Device," and a recording medium ID is described in the tag "Media."

Information transmitted from the recording medium ID detector 1601 of the video camera 1600 is received and processed by the connected media information obtaining unit 1501 in the video editing device 1500. The connected media information obtaining unit 1501 analyzes the received information, and looks recording medium ID information contained therein up in the missing video manager 119. As described above, the missing video manager 119 can be used, using a particular recording medium ID as a search key, to easily determine whether or not there is any video which the video editing device 1500 has failed to obtain, of main-track video data presumed to be stored in the recording medium, and if any, what video it is, what playlist the video is put on, and what portion of the video is necessary on the playlist.

If, as a result of the looking up, it is determined that there may be main-track video data which the video editing device 1500 has failed to obtain in the recording medium 406 of the video camera 1600, an attempt is made again to obtain high-resolution video data for each piece of such video data using the same procedure that has been described in the first embodiment. When the attempt has succeeded, main-track video data missing from the second recording medium 115 is automatically repaired in the same manner that has been described in the first embodiment.

[2-3. Advantages Etc.]

With the above configuration, a video editing device can be constructed so that even if the video editing device has failed to obtain high-resolution video data, because, for example, a recording medium has been removed from a video camera, the user can obtain a best editing result that is available at that time. Also, the video editing device can automatically search for the high-resolution video data which the video editing device has failed to obtain, on a network, and if it is found, adds a change to the editing result based on the high-resolution video data. A high-resolution video is searched for using the ID of a recording medium presumed to store the video instead of the ID of the video itself. Therefore, when a video file has been moved to another recording medium, a high-resolution video file cannot be obtained, which is disadvantageous. However, the amount of communication between a video editing device and an external terminal, and the amount of processing performed in a video editing device, are significantly reduced compared to the first embodiment. In a place where shooting is performed, it is less likely that a video file is moved from one recording medium to another recording medium. Therefore, the above system can satisfactorily achieve the advantages of the present disclosure in practical use.

(Other Embodiments)

By using the above video editing device of the first or second embodiment, the user can browse a video captured by a video camera using a low-resolution video from a remote place through a network to select a necessary range. The user who is far away from a video camera can receive a selected range of high-resolution video data from the video camera. Even if a video camera has been turned off or a recording medium has been removed from a video camera when the user begins receiving high-resolution video data, the user can obtain a video having best quality that is available at that time. The video editing device automatically continues to search for a portion of a high-resolution video which has not been successfully obtained, and if such a portion is found, a low-resolution video is replaced with the portion of the high-resolution video. Therefore, after a certain period of time has passed, it can be expected that all high-resolution videos have been obtained.

In the foregoing description, the first and second embodiments have been illustrated as examples of the technology disclosed herein. The present disclosure is not limited to these. The present disclosure is applicable to the embodiments to which changes, replacements, additions, deletions, etc. have been made. Parts of the first and second embodiments may be combined to obtain other new embodiments.

Therefore, other embodiments will now be described.

In the first and second embodiments, for the sake of convenience, a proxy video and a main-track video are stored in separate recording media, i.e., the first recording medium 104 and the second recording medium 115, respectively. These media do not necessarily need to be physically separate recording media. Also, for the sake of convenience, in FIGS. 1 and 15, a main-track video and a playlist are stored in separate recording media, i.e., the second recording medium 115 and the third recording medium 121, respectively. These media do not necessarily need to be physically separate recording media.

Although, in the first embodiment, the video camera 400 including the image capture unit 401 is used as an example of the external terminal 101, the external terminal 101 does not necessarily need to include the image capture unit 401. The external terminal 101 may be any electronic equipment that has the function of generating high-resolution video data and low-resolution video data and the function of transferring video data to the video editing device 100 through a network. The source video may be obtained from an external input. Alternatively, a video stored in a recording medium included in the external terminal 101 may be directly used as the source video. The above example communication means included in the external terminal 101 employs wireless communications, but does not necessarily need to be wireless. The communication means only needs to have the function of transferring video data to external equipment, and therefore, for example, may be a wired LAN or a telephone line.

Although the video camera 400 of the first embodiment stores a meta-data file in the recording medium 406 in addition to a high-resolution video file and a low-resolution video file, the video file and the meta-data file do not necessarily need to be separate files. The additional information may be embedded in the video file (e.g., the additional information may be stored in a meta-data area of MXF or a FREE area of MPEG4).

The video extractor 413 is not essential for the video camera 400 of the first embodiment. This is because even when the video camera 400 of the first embodiment is configured to transfer, to the video editing device 100, the entirety of a main-track video file corresponding to a video ID which the video camera 400 has been informed of, the subject matter of the present disclosure can be achieved. However, it may take a lot of time to transfer high bit-rate main-track video data when a network between the external terminal 101 and the video editing device 100 has some level of quality. Therefore, it is reasonable to extract and transfer only a specified portion in order to complete transfer of a necessary range of video as quickly as possible.

Although, in the first embodiment, the playlist generator 106 provides the playlist generation function to the user through a web server, the playlist generation function does not necessarily need to be used through a network. The playlist generation function may be provided in any form that has the function of specifying a necessary video range using low-resolution video data. The video editing device 100 may include a screen, and the playlist generation function may be an application which is directly operated by the user on the screen.

In the first embodiment, the second recording medium 115 and the third recording medium 121 may be a recording medium in which a plurality of folders can be generated to store video files etc., i.e., may be a hard disk drive (HDD) or a solid state drive (SSD) formatted in some file system. The file system does not necessarily need to be involved in handling the second recording medium 115 and the third recording medium 121 in order to achieve the advantages of the present disclosure. For example, the second recording medium 115 and the third recording medium 121 may be a primary storage device (i.e., a main memory) of a computer. In this case, the second recording medium 115 and the third recording medium 121 may be only a temporary data storage which is used in the process in which the user 123 stores electronic data output by the main-track video receiver 110 or the playlist manager 111 to their own computer through a network, and may not need to permanently store the data. Also in this case, the network storage provider 115 is software which transfers data in a memory to a computer of the user 123. Specifically, the network storage provider 115 may be software, such as FTP client software or web server software.

As described above, embodiments of the technology disclosed herein have been illustrated. To do so, the accompanying drawings and the detailed description have been provided.

Therefore, the components described in the drawings and the detailed description may include not only components essential for achieving the present disclosure, but also non-essential components which are used to illustrate the above technology. Therefore, the non-essential components should not be immediately considered as being essential because those components are described in the drawings and the detailed description.

The above embodiments are for the purpose of illustration of the technology of the present disclosure, and therefore, various changes, replacements, additions, deletions, etc., can be made thereto within the scope of the claims or equivalents thereof.

The video editing device of the present disclosure allows the user who is located far from a video camera to copy video data captured by the video camera to their own personal computer (PC). In addition, a necessary portion of the video can be obtained with best quality that is available at that time through a network. For example, this means that the staff in a broadcast station can obtain a high-quality and most-recent video without waiting for a cameraman who has gathered news at a remote place to return to the office. An increase in operation speed and a reduction in cost of systems can be expected in industries which provide video services.

What is claimed is:

1. A video editing device connected to a network comprising:
a proxy video receiver configured to receive low-resolution video data from an external terminal through the network;
a first recording medium configured to store the low-resolution video data received by the proxy video receiver;
an extraction command issuance unit configured to transmit, to the external terminal, a command to extract and transfer high-resolution video data corresponding to information of video data included in a playlist which is generated by a user using the low-resolution video data stored in the first recording medium;
a main-track video receiver configured to receive the high-resolution video data from the external terminal;
a second recording medium configured to store the high-resolution video data received by the main-track video receiver;
a reception error detector configured to detect a failure to obtain the high-resolution video data from the external terminal; and
a video supplementation unit configured to, when the reception error detector has detected the failure to obtain the high-resolution video data, supply low-resolution video data corresponding to the high-resolution video data instead of the high-resolution video data.

2. The video editing device of claim 1, further comprising:
a playlist changing unit configured to, when the reception error detector has detected the failure to obtain the high-resolution video data, replace information related to the high-resolution video data which has not been successfully received, of information of video data included in the playlist generated by the user, with information related to low-resolution video data corresponding to the high-resolution video data; and
a third recording medium configured to store the playlist generated by the playlist changing unit.

3. The video editing device of claim 2, wherein
the playlist changing unit, when replacing information related to the high-resolution video data which has not been successfully received, of information of video data included in the playlist, with information related to low-resolution video data corresponding to the high-resolution video data, describes, on the playlist, the replacement of the high-resolution video data which has not been successfully received with the low-resolution video data, and ID information for uniquely identifying the high-resolution video data which has not been successfully received.

4. The video editing device of claim 1, further comprising:
a playlist generator configured to specify a range of a video for which the user desires high-resolution video data, using the low-resolution video data stored in the first recording medium.

5. The video editing device of claim 1, further comprising:
a missing video manager configured to, when the reception error detector has detected a failure to receive high-resolution video data, store ID information for uniquely identifying the high-resolution video data; and
an external terminal content information obtaining unit configured to obtain a list of ID information of video data stored in a recording medium inserted in the external terminal, through the network,
wherein when the external terminal content information obtaining unit has detected that video data having ID information matching ID information stored in the missing video manager exists in the recording medium inserted in the external terminal, the extraction command issuance unit transmits, to the external terminal, a command to extract and transfer the video data whose ID information is stored in the missing video manager.

6. The video editing device of claim 1, further comprising:
a missing video manager configured to, when the reception error detector has detected a failure to receive high-resolution video data, store ID information for uniquely identifying a recording medium storing the high-resolution video data in the external terminal, and ID information for uniquely identifying the high-resolution video data, in association with each other; and
a connected media information obtaining unit configured to obtain information of the recording medium inserted in the external terminal, through the network,
wherein when the connected media information obtaining unit has detected that a recording medium having ID information matching ID information of a recording medium stored in the missing video manager is inserted in the external terminal, the extraction command issuance unit transmits, to the external terminal, a command to extract and transfer video data having ID information matching ID information of video data which is stored in the missing video manager in association with the ID information of the recording medium.

* * * * *